United States Patent [19]

Rock

[11] Patent Number: 4,629,759

[45] Date of Patent: Dec. 16, 1986

[54] FLAME RETARDANT POLYETHERIMIDE-POLYCARBONATE BLENDS

[75] Inventor: John A. Rock, Becket, Mass.

[73] Assignee: General Electric Company, Pittsfield, Mass.

[21] Appl. No.: 791,875

[22] Filed: Oct. 28, 1985

[51] Int. Cl.$^4$ .............................................. C08L 79/08
[52] U.S. Cl. ........................................ 525/66; 525/67; 525/146; 525/147
[58] Field of Search ................. 525/67, 146, 148, 902, 525/422, 66, 147; 260/DIG. 24

[56] References Cited

U.S. PATENT DOCUMENTS

| | | | |
|---|---|---|---|
| 4,250,279 | 2/1981 | Robeson et al. | 525/425 |
| 4,395,518 | 7/1983 | Giles, Jr. et al. | 525/180 |
| 4,430,484 | 2/1984 | Quinn | 525/425 |
| 4,539,370 | 9/1985 | Nouvertné et al. | 525/67 |
| 4,548,997 | 10/1985 | Mellinger et al. | 525/67 |

Primary Examiner—Theodore E. Pertilla
Attorney, Agent, or Firm—Edward K. Welch, II; William F. Mufatti; Richard J. Traverso

[57] ABSTRACT

Flame retardant polyetherimide/polycarbonate blend are prepared by incorporating therein a flame retarding modifier therefor selected from the group consisting of brominated polystyrenes and a mixture thereof with an acrylic rubber composite interpolymer.

21 Claims, No Drawings

FLAME RETARDANT POLYETHERIMIDE-POLYCARBONATE BLENDS

The present invention relates to novel polyetherimide/polycarbonate blend compositions having excellent solvent resistance, flame resistance and impact strength as a result of incorporating therein a property improving amount of a modifier therefore selected from the group consisting of brominated polystyrene and a mixture of brominated polystyrene and an acrylic rubber composite interpolymer.

BACKGROUND OF THE INVENTION

Binary blends of polyetherimide and polycarbonate are known. Mellinger et al, U.S. Pat. No. 4,548,997 teach such blends as having a higher heat distortion temperature and improved flexural and tensile strengths over the polycarbonate alone. Additionally, such compositions have higher impact strength than the polyetherimide component and excellent flame resistance.

It is also known to blend polyetherimide with acrylate copolymers. Giles et al, U.S. Pat. No. 4,395,518 teach acrylate copolymer modified polyetherimides as having higher impact strength than is normally associated with the polyetherimide component as well as improved extrusion and molding performance characteristics.

More recently, Rock et al, Ser. No. 687,026 filed Dec. 28, 1984, have taught ternary blends of polyetherimide, polycarbonate and an acrylic rubber interpolymer having improved impact strength without any adverse effect on tensile and flexural properties or heat distortion characteristics as compared to the unmodified blend.

While all of the foregoing compositions have excellent impact strengths as compared to the polyetherimide component alone, as a result of the incorporation of polycarbonate and acrylic impact modifier, these compositions have increased flammability, whereas polyetherimides are known to have good flame resistance. Consequently, it is the purpose of the present invention to provide polyetherimide compositions having excellent physical characteristics, particularly impact strength, and good flame resistance.

Because polyetherimides are generally known to have excellent flame resistance in and of themselves, there has been no need for and thus no teaching or direction on how to improve the flame resistance of such compositions. While it is known in other polymer genera to employ various phosphorus and halogen containing compounds as a flame retardant additive, it is also well recognized that such flame retardants tend to be polymer or genus specific. That is, while it may enhance flame resistance in one polymer, it may have no effect in another. Consequently, the operation of flame retardants tends to be unpredictable. Furthermore, it is well recognized that the addition of such flame retarding compounds also adversely affects the physical characteristics of the polymer itself, often resulting in poor impact strength, reduced flexural and tensile strengths as well as reduced solvent resistance in some cases.

Therefore, there exists a need for a composition which exhibits excellent impact properties and flame resistance, without a concomitant loss in other desirable physical and chemical properties of the polyetherimide.

SUMMARY OF THE INVENTION

In accordance with the present invention there is provided a novel, flame resistant polymeric blend composition comprising an admixture of a polyetherimide, a polycarbonate and a property improving modifier therefore selected from the group consisting of brominated polystyrene and a combination of brominated polystyrene and an acrylic rubber composite interpolymer. These blend compositions exhibit excellent flame retardance without a loss or a substantial loss of other desired physical characteristics including solvent resistance and tensile and flexural strength. More surprisingly, these compositions also have enhanced impact strength as compared to the binary or ternary systems of the prior art.

DETAILED DESCRIPTION OF THE INVENTION

The present invention relates to modified polyetherimide/polycarbonate blends having excellent flame resistance, solvent resistance and impact strength. Surprisingly, the addition of the brominated polystyrene or the acrylic rubber composite interpolymer/brominated polystyrene modifier combination does not adversely affect the excellent physical characteristics of the binary and ternary compositions of the prior art, but rather results in enhanced impact strength and excellent flame resistance.

The polyetherimide component of the blends of this invention contain repeating groups of the formula:

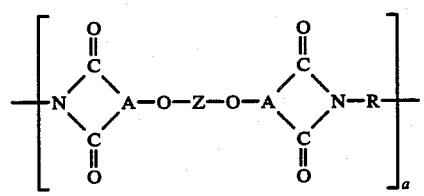

where "a" represents a whole number in excess of 1, e.g., 10 to 10,000 or more, the group —O—A< is selected from:

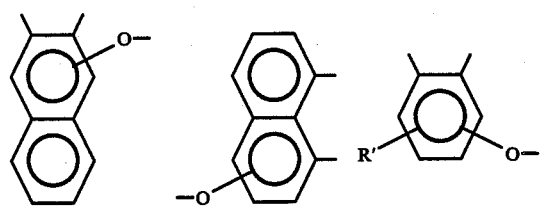

R' being hydrogen, lower alkyl or lower alkoxy. Preferably, the polyetherimide includes the latter —O—A< group where R' is hydrogen, such that the polyetherimide is of the formula:

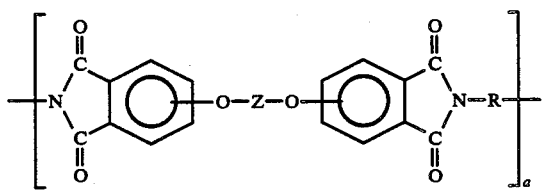

and the divalent bonds of the —O—Z—O— radical are in the 3,3'; 3,4'; 4,3' or the 4,4' position; Z is a member of the class consisting of (1)

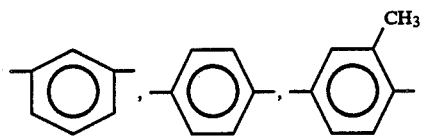

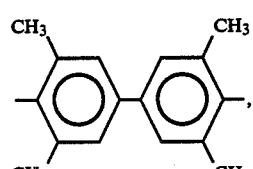

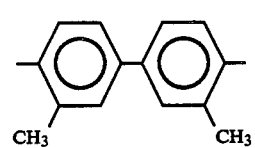

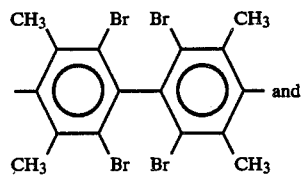

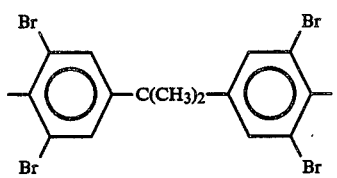

and (2) divalent organic radicals of the general formula:

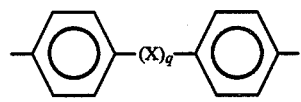

where X is a member selected from the class consisting of divalent radicals of the formulas,

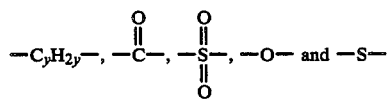

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_2$ to $C_8$ alkylene terminated polydiorganosiloxane, and (3) divalent radicals included by the formula

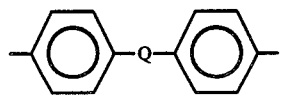

where Q is a member selected from the class consisting of

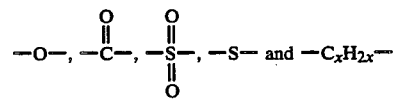

where x is a whole number from 1 to 5 inclusive. Particularly preferred polyetherimides for the purpose of the present invention include those where —O—A< and Z respectively are:

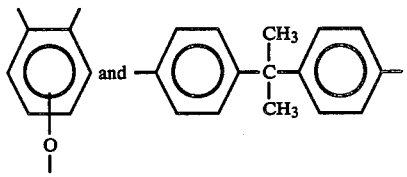

and R is selected from:

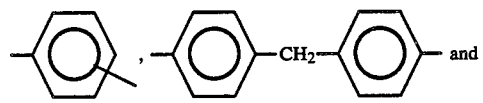

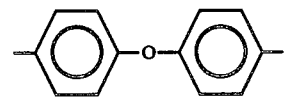

The polyetherimides where R is m-phenylene are most preferred.

In one embodiment, the polyetherimide may be a copolymer which, in addition to the etherimide units described above, further contains repeating units of the formula

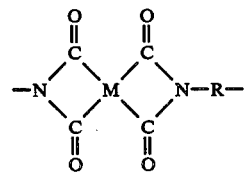

wherein R is as previously defined and M is selected from the group consisting of

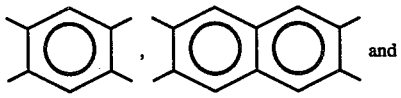

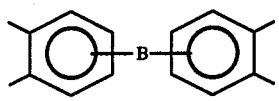

where B is —S— or

.

These polyetherimide copolymers are described by Williams et al. in U.S. Pat. No. 3,983,093, incorporated herein by reference.

The polyetherimides can be obtained by any of the methods well known to those skilled in the art including the reaction of an aromatic bis(ether anhydride) of the formula:

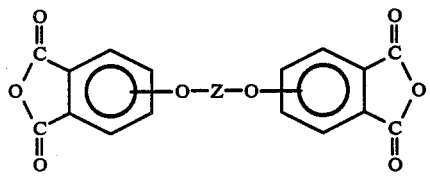

where Z is as defined herein before with an organic diamine of the formula

H$_2$N-R-NH$_2$ where R is as defined herein before.

Aromatic bis(ether anhydride)s of the above formula include, for example, 2-bis[4-(2,3-dicarboxyphenoxy)-phenyl]propane dianydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis-[4-(3,4-dicarboxyphenoxy)phenyl]propane dianhydride; 4,4'-bis(3,4-dicarboxy)diphenyl ether dianhydride; 4,4'-bis(3,4-dicarboxy)diphenyl sulfide dianhydride; 1,3-bis(3,4-dicarboxyphenoxy)benzene dianhydride; 1,4-bis(3,4-dicarboxyphenoxy)benzene dianhydride; 4,4-bis-(3,4-dicarboxyphenoxy)benzophenone dianhydride; 4-(2,3-dicarboxyphenoxy)-4'-(3,4-dicarboxyphenoxy)-diphenyl-2,2-propane dianhydride; etc. and mixtures of such dianhydrides.

In addition, aromatic bis(ether anhydride)s included in the above formulas are shown by Koton, M.M.; Florinski, F.S.; Bessonov, M.I.; Rudakov, A.P. (Institute of Heteroorganic Compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh. Org. Khin., 4(5) 774 (1968).

Organic diamines of the above formulas include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5 diaminonaphthalene, 3,3'-dimethylbenzidine, 3,3'-dimethoxybenzidine, 2,4-bis(B-amino-t-butyl)toluene, bis(p-B-amino-t-butylphenyl)ether, bis(p-B-methyl-o-aminopentyl)benzene, 1,3-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylene diamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc. and mixtures of such diamines.

In general, the reactions can be carried out by employing well-known solvents, e.g., o-dichlorobenzene, m-cresol/toluene, etc. to effect interaction between the dianhydrides and the diamines, and temperatures of from about 100° C. to about 250° C. Alternatively, the polyetherimides can be prepared by melt polymerization of any of the above dianhydrides with any of the above organic diamines while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Included in the many methods of making the polyetherimides are those disclosed in U.S. Pat. Nos. to Heath et al., 3,847,867, Williams 3,847,869, Takekoshi et al., 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

Polycarbonates for use in the blends of the invention are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one as measured in methylene chloride at 25° C. In one embodiment, the polycarbonate are derived from dihydric phenols and carbonate precursors and generally contain recurring structural units of the formula;

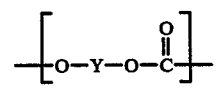

where Y is a divalent aromatic radical of the dihydric phenol employed in the polycarbonate producing reaction.

Suitable dihydric phenols for producing polycarbonates include, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)-propane, 2,2-(3,5,3',5'-tetrabromo-4,4'-dihydroxyphenyl)propane, and 3,3'-dichloro-4,4'-dihydroxydiphenyl)methane. Other dihydric phenols which are also suitable for use in the preparation of the above polycarbonates are disclosed in U.S. Pat. Nos. 2,999,835; 3,038,365; 3,334,154; and 4,131,575, incorporated herein by reference.

It is of course possible to employ two or more different dihydric phenols or a copolymer of a dihydric phenol with a glycol or with a hydroxy or acid terminated polyester, or with a dibasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate such as di(chlorophenyl)carbonate, di(bromophenyl)carbonate, di(trichlorophenyl)carbonate, di(tribromophenyl)carbonate, etc.; di(alkylphenyl)carbonate such as di(tolyl)carbonate, etc.; di(naphthyl)carbonate; di(chloronaphthyl)carbonate; etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of aromatic polyestercarbonates are those derived from bisphenol A; terephthalic acid or isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5.

The polycarbonates of the subject blends can be manufactured by known processes, such as, for example, by reacting a dihydric phenol with a carbonate precursor such as diohenyl carbonate or phosgene in accordance with methods set forth in the above-cited literature and U.S. Pat. Nos. 4,018,750 and 4,123,436, or by transesterification processes such as are disclosed in the U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Brominated polystyrenes are well-known and widely available. Such brominated polystyrene may have aliphatic and/or aromatic substitution. Because of the high processing temperature and the tendency of aliphatic substituted bromine to dissociate from the polymer at between 200°–250° C., it is preferred that the brominated polystyrene be aromatically substituted.

Generally, the brominated polystyrene may be prepared by polymerization of suitable brominated styrenes, by direct bromination of the styrene polymer or by the graft polymerization of brominated styrenes on a preformed polymer, particularly a rubber polymer. In German Pat. No. 1,570,395, heat stable styrene polymers were obtained by polymerization of nuclear brominated styrene. Generally, the brominated styrenes are prepared by hydrobromination of the vinyl group followed by bromination of the nuclear ring with subsequent dehydrobromination of the bromoethyl group to form the desired product.

Direct bromination of the polystyrene itself may be accomplished by several known methods. For example, one may allow gaseous bromine to act on undissolved, finely-particled styrene polymers. Alternately, the styrene may be cationically polymerized in solution in the presence of a Lewis acid catalyst and adding bromine to the reaction solution, with or without additional Lewis acid catalyst, and recovering the brominated polystyrene after completion of the bromination reaction. Still further, one could brominate polystyrene at between −20° C. to 40° C. in a chlorinated hydrocarbon solvent in the presence of both a Lewis acid catalyst and a nucleophilic substance which acts as a Lewis acid base for the Lewis acid.

Additional processes as well as further detail on all of the foregoing processes, including polymerization of brominated styrenes and direct bromination of the polystyrene, may be found in U.S. Pat. Nos. 2,823,201; 3,752,856; 3,867,468; 3,966,831; 4,074,032; 4,143,221 and 4,200,703; German Pat. No. 1,570,395; Vogel, H; "Flammfestmaches von Kunstoffen" (Flameproofing of Plastics) A. Huthig Verlag, pp. 66–67(1969) and Cubborn, R.C.P. et al, "Properties of Nuclear Brominated Styrene I; Synthesis and Polymerization of Dibromostyrene and Tribromostyrene", Polymer 10(7), pp. 479–487 (1969); all incorporated herein by reference.

The brominated polystyrene of the present invention may be homopolystyrene, polymers of styrene derivatives, copolymers of styrene and/or styrene derivatives, and copolymers of styrene compounds and other compounds copolymerizable therewith. Derivatives of styrene mean substituted derivatives thereof and include those substituted on the vinyl radical, on the benzene nucleus or both simultaneously. Suitable substituents include the lower alkyl groups, especially methyl or ethyl radicals and halogen, including chlorine or bromine. Such derivatives include α-methylstyrene, o-methylstyrene, p-methylstyrene, p-ethylstyrene, chlorostyrene and the like. Copolymers of styrene and/or styrene derivatives with another compound copolymerizable therewith will generally contain up to 50% by weight, preferably 5 to 20% by weight of the comonomer based on the total weight of the polymer. Suitable comonomers include the vinyl compounds and compounds of the ethylene type such as the vinyl esters and vinyl ethers, e.g. vinyl acetate, vinyl ethyl ether and vinyl methyl ether; butadiene; isoprene; and compounds having oxygen or nitrogen atoms in their molecule, as for example, acrylic acid esters, methacrylic acid esters and acrylonitriles. Preferred brominated polystyrene are the homopolystyrenes, particularly poly(dibromostyrene) and poly(tribromostyrene), most preferable poly(2,4 dibromostyrene) and poly(2,4,5 tribromostyrene).

The molecular weight of the brominated polystyrenes may vary widely, generally they will be from about 8,000 to 800,000, preferably from about 50,000 to 500,000, most preferably for about 100,000 to 250,000 (weight average) less the bromine. Bromine content may also vary widely and, as mentioned above, preferably all the bromine is aromatically bound. Generally, the brominated polystrenes will have a bromine content of up to 80% by weight, preferably from about 20 to about 70% by weight. Such brominated polystyrenes may also contain a minor amount, preferably no more than about 5% by weight chlorine and/or aliphatically bound bromine.

Finally, as mentioned above, the brominated polystyrenes also include copolymers prepared by graft copolymerizing brominated styrene and/or styrene derivatives of the formula

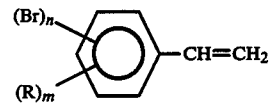

where R is a lower alkyl group (e.g. methyl, ethyl, butyl, etc.), m is 0 to 3, preferably 0 to 1 and n is 1 to 5, preferably 2 or 3 and (n+m) 5, on a rubbery polymer such as SBR rubber (butadiene-styrene copolymers), EPR rubber (ethylenepropylene copolymers), EPDM rubber (i.e. terpolymers of ethylene, propylene and a diene monomer), polyisoprene rubber (e.g. cis-1,4-polyisoprene and trans-1,4-polyisoprene), neoprene (i.e. polymers and copolymers of 2-chloro-1,3-butadiene), cis-1,4-polybutadiene and polybutadienes having mixed structures (e.g. cis-1,4; trans-1,4 and 1,2 structures) with the polybutadienes being particularly preferred.

In general, the bromine content of these graft copolymers will be the same as described above, preferably from about 40 to 70 weight percent. Such graft copolymers may be prepared in accordance with the teaching of U.S. Pat. No. 4,279,808, herein incorporated by reference.

The foregoing brominated polystyrenes may be used alone or in combination with an acrylic rubber composite interpolymer. When present, such acrylic rubber composite interpolymers will generally comprise from about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylate rubber core which is crosslinked with about 0.1 to 5 percent by weight of a suitable cross-linking monomer and to which is added about 0.1 to 5 percent by weight of a graft-linking monomer.

Suitable alkyl acrylates include methyl acrylate, ethyl acrylate, isobutyl acrylate and n-butyl acrylate. The preferred acrylate is n-butyl acrylate.

The cross-linking monomer is a polyethylenically unsaturated monomer having a plurality of additional polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate.

The graft-linking monomer is a polyethylenically unsaturated monomer having a plurality of addition polymerizable reactive groups, at least one of which polymerizes at a substantially different rate of polymerization than the other reactive groups. The graft-linking monomer provides a residual level of unsaturation in the elastomeric phase, particularly in the latter stages of polymerization and, consequently, at or near the surface of the elastomeric particle. The preferred graft-linking monomer is alkyl methacrylate and dialkyl maleate.

The rigid thermoplastic phase can be comprised of $C_1$ to $C_{16}$ methacrylate, styrene, acrylonitrile, alkyl acrylates, alkyl methacrylate, dialkyl methacrylate and the like. Preferably, this phase is at least about 50 weight percent $C_1$ to $C_4$ alkyl methacrylate.

In a preferred embodiment of the present invention, the acrylate graft polymer is an acrylic rubber composite interpolymer which is available commercially from the Rohm & Haas Corporation, Philadelphia, Pennsylvania under the tradename Acryloid ® KM-330. That acrylate graft polymer is characterized in that its acrylic rubber core comprises n-butyl acrylate and in that its cross-linking agent is 1,3-butylene diacrylate, and in that its graft-linking agent is dialkyl maleate and in that the rigid thermoplastic phase monomeric system is methyl methacrylate.

Additional suitable acrylate graft copolymers are those described in U.S. Pat. Nos. 3,808,180; 3,843,753, and 4,022,748, incorporated by reference herein.

In the practice of the present invention, the polyetherimide and polycarbonate will generally be present in a weight ratio of from about 20 to 80:80 to 20, (the sum of the weight ratio equiling 100) the specific amount being dependent, in part, on the final characteristics desired of the final composition, i.e. stress/strength properties, flowability, etc. For example, higher amounts of polyetherimide usually contribute to superior mechanical properties and high heat deflection temperature for the blend; whereas, higher proportions of polycarbonate usually contribute to lowering the glass transition temperature and melt viscosity of the blends. The amount by which the brominated polystyrene or brominated polystyrene/acrylic rubber composite interpolymer blend may be used is that amount which is sufficient to produce the desired impact strength and flame resistance. Generally, the brominated polystyrene will be present in an amount of from about 1 to about 10% by weight based on the total composition and the amount of acrylic rubber composite interpolymer, if present, will be from about 0.5 to 10% by weight. While higher amounts of brominated polystyrene may be used, the resultant compositions often have poor stress/strength properties (e.g. elongation and impact strength). With lower amounts, there may not be sufficient bromine present to provide the necessary degree of flame resistance. Similarly, higher or lower amounts of acrylic rubber composite interpolymer may also be used, however, higher amounts increase the flamability of the composition and result in delamination in parts molded therefrom without a commensurate increase in impact strength and with lower amounts the improvement in impact strength is negligible.

An especially preferred group of compositions within the scope of the present invention are those wherein the weight ratio of polyetherimide to polycarbonate is from about 75 to 45:25 to 55 (the sum of the weight ratio equaling 100), the amount of brominated polystyrene is from about 3 to about 7 weight percent, preferably 4 to 6 weight percent, based on the total composition and the acrylic rubber composite interpolymer, if present, amounts to 1 to 5% by weight of the composition. In these preferred compositions it has generally been found that impact strengths in excess of the binary polyetherimide/polycarbonate blend or ternary polyetherimide/polycarbonate/acrylic rubber composite interpolymer blend, respectively, are attainable.

It is contemplated that the blends of the present invention may also include other additive materials such as fillers, stabilizers, plasticizers, flexibilizers, surfactant agents, pigments, dyes, reinforcements, and dilutents in conventional amounts. It is also contemplated that the blends of the invention may include two or more polyetherimides in combination with one or more polycarbonates or two or more polyetherimides.

Methods for forming blends of the present invention may vary considerably. Conventional blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The subject blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blend of this invention may be used in applications where films have been used previously. Thus, the blends of the present invention can be used in automotive and aviation applications for utility, decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

In addition, molding compositions and molded articles may be formed from the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific polymeric blends in accordance with the present invention. It should be understood that the examples are given for the purpose of illustration and do not limit the invention. In the examples, all parts and percentages are by weight unless otherwise specified.

Except as described below, all physical properties were determined in accordance with accepted ASTM methods.

ESCR—Environmental Stress Crack Resistance was determined on specimens "as molded" having dimensions of 2.5"×0.5"×0.125". These were clamped onto fixtures having a constant radius of curvature such that a predetermined (predicted) % strain of 0.125, 0.25, 0.375, 0.5, 0.66, 0.87 and 1.1, were imparted to the bent specimen's outer surface. The surface thus subjected to strain was then exposed to a potentially agressive media (solvent) by swabbing the surface with the solvent at one half hour intervals for the first four hours and hourly intervals for the fifth and sixth hour, allowing the solvent to evaporate between applications. The test specimens were visually inspected for indication of attack, such as crazing, cracking or solvation or total failure (break).

OSU—Ohio State Heat Release test performed in accordance with the procedures set forth in 14 CFR part 25 as modified by Federal Register Notice, Volume 50, No. 73 pages 15038 to 15053 dated Apr. 16, 1985 and subsequently modified by Federal Register, Volume 50, No. 144, pages 30447 to 30448 dated July 26, 1985.

UL-94 - Flammability tests were performed in accordance with Underwriter's Laboratory Bulliten 94 entitled "Combustion Tests for Classification of Materials, UL-94".

All compositions were prepared by dry blending the ingredients and extruding the mix on a Werner Pfleiderer extruder. The extrudate was comminuted into pellets and the pellets injection molded into test specimens.

EXAMPLES 1-3, COMPARATIVE EXAMPLES A-D

Various compositions within the scope of the present invention were prepared and compared to compositions of the prior art. The specific formulations of those compositions and the physical properties obtained therefrom were as shown in Table 1.

From Table 1 it is clear that the inclusion of poly(tribromostyrene) in a polyetherimide/polycarbonate blend leads to an unexpected and dramatic increase in impact strength of the composition, while also providing added flame retardancy. Although UL determinations were not made for all compositions, it is believed that all compositions within the scope of the invention would attain a V-0 rating whereas those outside the scope of the invention, particularly those with the acrylic rubber composite interpolymer and/or a high polycarbonate content but without the brominated polystyrene would at best achieve a marginal UL-94 V-0 rating and, more likely, the failure of the UL-94 test.

Furthermore, it was noted that with the exception of tensile elongation at break, for which some loss of property was evident, and the above-mentioned benefits, there was very little, if any, effect on the general physical properties of the compositions including tensile elongation at yield, tensile strength, flexural strength and flexural modules.

The composition of the present invention also exhibited excellent solvent resistance as compared to either the polyetherimide or polycarbonate resins themselves. Whereas polyetherimide failed with a break at a % strain of less than 0.87(less than 0.66 in some examples), all the compositions within the scope of the present invention passed at the 1.1 % strain level with little, if any, observable crazing, cracking and the like. Polycarbonate alone was not tested because of its well-known lack of solvent resistence, particularly as compared to polyetherimide.

Also of importance from Table 1, is the excellent OSU Heat release values obtained by the compositions of the present invention as compared to those outside the scope of the present invention. Heat release is very important for applications for use where flame resistance and slow burn is desired, as for example in the constuction of and furnishing of aircraft, ships and the like. Applicant's results indicate a very slow heat release thus burn rate under continuous exposure to a radiant source.

EXAMPLES 4+5, COMPARATIVE EXAMPLE E

A second series of samples were prepared incorporating a pigment in the composition as well as an acrylic rubber composite interpolymer. These compositions and the properties thereof were as shown in Table 2.

As is evident from Table 2, the combination of acrylic rubber composite interpolymer and poly(tribromostyrene) greatly enhances the impact strength of the composition. Applicant acknowledges the loss of impact strength in Example 4; however believes subsequent testing will prove this result to be in error, particularly since the Dart impacts were equivalent to that of Examples which had a much greater Notched Izod impact. Generally, though it is clear that the composition of the present invention manifested improved properties over the comparative examples and had excellent flame resistance.

TABLE 1

|  | A | B | C* | 1 | 2 | D | 3 |
|---|---|---|---|---|---|---|---|
| PEI I[a] | 100 | 70 | 70 | 65 | 47.5 | — | — |
| PEI II[b] | — | — | — | — | — | 70 | 65 |
| PC[c] | — | 30 | 30 | 30 | 47.5 | 30 | 30 |
| PBS[d] | — | — | — | 5 | 5 | — | 5 |
| Notched Izod (ft. lb/in) RT | — | 0.86 | 0.87 | 1.65 | 1.5 | 0.86 | 1.5 |
| Dynatup (Emax) (ft. lb) | — | — | 48 | 53 | — | 27 | 12 |
| HDT @ 264 psi (°C.) | — | 174.8 | 170.7 | 175.1 | 145.1 | 180.9 | 180 |
| UL-94 | — | — | V-0 | — | — | V-0 | V-0 |
| OSU |  |  |  |  |  |  |  |
| 2 Min Heat Release (KW/sq. m) | — | — | — | — | — | 86 | 22 |
| Max Heat Release Rate (KW. min/sq. m) | — | — | — | — | — | 110 | 90 |
| ESCR |  |  |  |  |  |  |  |
| Toluene | .87 | — | 1.1 | — | 1.1 | 1.1 | 1.1 |

TABLE 1-continued

|  | A | B | C* | 1 | 2 | D | 3 |
|---|---|---|---|---|---|---|---|
| MEK |  | .87 | — | 1.1 | — | 1.1 | 1.1 | 1.1 |

$^{a+b}$ULTEM ® 1000 and ULTEM ® 1010 polyetherimide resins, respectively, from General Electric Company
$^c$LEXAN ® 131 polycarbonate resin from General Electric Company
$^d$PYROCHECK ® 68PB poly(tribromostyrene) from Ferro Corporation
*prepared on 2¼" HPM extruder

TABLE 2

|  | E | 4 | 5 |
|---|---|---|---|
| PEI, I$^a$ | 46.75 | 44.4 | 43.5 |
| PC$^b$ | 46.75 | 44.4 | 43.5 |
| PBS$^c$ | — | 4.7 | 4.7 |
| KM$^d$ | — | — | 1.9 |
| Pigments | 6.5 | 6.5 | 6.5 |
| Notched Izod ft. lb/in | 1.1 | 0.7 | 3.9 |
| Dart Impact (in-lb) | — | 140 | 140 |
| Dart Impact w/Scribe (in-lb) | — | 128 | 128 |
| UL-94 | BURN | V-O | V-O |

$^a$See footnote a Table 1
$^b$See footnote c Table 1
$^c$See footnote d Table 1
$^d$KM 330 n-butyl acrylate core, core-shell copolymer from Rohm and Haas.

What is claimed is:

1. A flame retartant polymeric blend comprising in admixture (a) a polyetherimide, (b) an aromatic thermoplastic polycarbonate and (c) a flame retarding amount of a flame retarding modifier selected from the group consisting of brominated polystyrene and a combination of brominated polystyrene and an acrylic rubber composite interpolymer.

2. The flame retardant blend of claim 1 wherein the polyetherimide and polycarbonate are present in a weight ratio of from about 20 to 80:80 to 20 and the flame retardant modifier is selected from the group consisting of brominated polystyrene in an amount of from about 1 to about 10 percent by weight or a combination thereof with an acrylic rubber composite interpolymer in an amount of from about 0.5 to about 10 percent by weight, each based on the total weight of the composition.

3. The flame retardant blend of claim 1 wherein the polyetherimide and polycarbonate are present in a weight ratio of from about 75 to 45:25 to 55 and the flame retardant modifier is selected from the group consisting of brominated polystyrene in an amount of from about 3 to about 7 percent by weight or a combination thereof with from about 1 to about 5 percent by weight of an acrylic rubber composite interpolymer.

4. The flame retardant blend of claim 1, wherein the polyetherimide contains repeating units of the formula

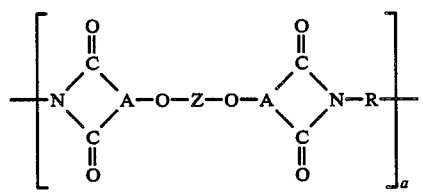

where "a" represents a whole number in excess of 1, e.g., 10 to 10,000 or more, the group —O—A< is selected from:

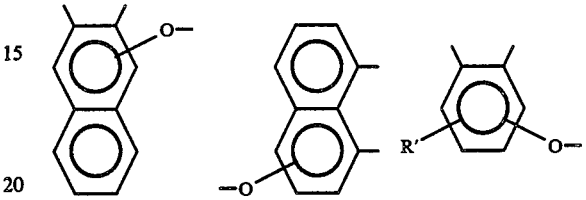

R' being hydrogen, lower alkyl or lower alkoxy; Z is a member of the class consisting of (1)

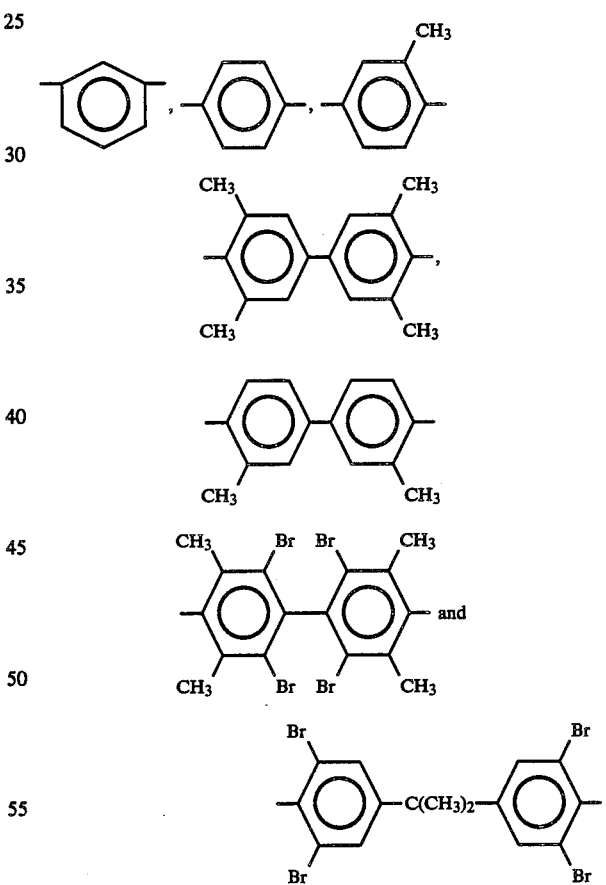

and (2) divalent organic radicals of the general formula:

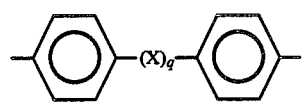

where X is a member selected from the class consisting of divalent radicals of the formulas,

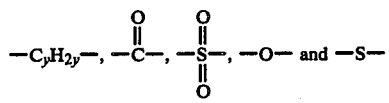

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_2$ to $C_8$ alkylene terminated polydiorganosiloxane, and (3) divalent radicals included by the formula

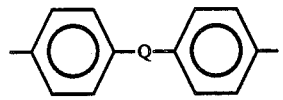

where Q is a member selected from the class consisting of

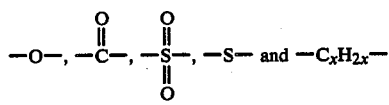

where x is a whole number from 1 to 5 inclusive.

5. The flame retardant blend of claim 4 wherein Z is

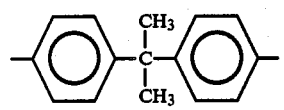

and R is selected from:

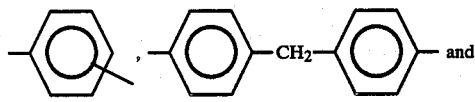

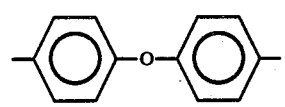

6. The flame retardant blend of claim 4 wherein the polyetherimide further contains repeating units of the formula

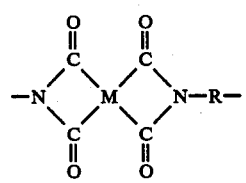

where M is selected from the group consisting of

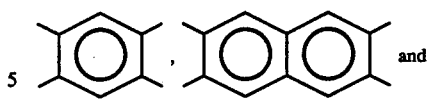

where B is —S— or

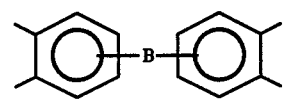

7. The flame retardant blend of claim 1 wherein the polycarbonate is selected from the group consisting of homopolycarbonates, copolycarbonates, polyestercarbonates and mixtures thereof.

8. The flame retardant blend of claim 7 wherein the polycarbonate is a homopolycarbonate or copolycarbonate derived from one or more dihydric phenols and one or more carbonate precursors.

9. The flame retardant blend of claim 8 wherein the dihydric phenol is 2,2-bis(4-hydroxyphenyl) propane and the carbonate precursor is carbonyl chloride.

10. The flame retardant blend of claim 8 wherein the dihydric phenol is 2,2-bis(4-hydroxyphenyl)propane and the carbonate precursor is diphenyl carbonate.

11. The flame retardant blend of claim 7 wherein the polycarbonate contains recurring structural units of the formula:

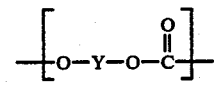

where Y is the divalent aromatic radical of the dihydric phenol employed in the polycarbonate producing reaction.

12. The flame retardant blend of claim 7 wherein the polycarbonate is a copolyestercarbonate derived from a dihydric phenol, a carbonate precursor and an aromatic dicarboxylic acid or reactive derivative thereof.

13. The flame retardant blend of of claim 12 wherein the aromatic dicarboxylic acid is terephthalic acid, isophthalic acid or a mixture thereof, wherein the weight ratio of terephthalic acid to isophthalic acid is from about 5:95 to about 95:5.

14. The flame retardant blend of claim 13 wherein the dihydric phenol is bisphenol A and the carbonate precursor is carbonyl chloride.

15. The flame retardant blend of claim 1 wherein the flame retarding modifier is an aromatically brominated polystyrene.

16. The flame retardant blend of claim 15 wherein the aromatically brominated polystyrene is selected from the group consisting of poly(dibromostyrene), poly(tribromostyrene) and mixtures thereof.

17. The flame retardant blend of claim 16 wherein the aromatically brominated polystyrene is poly(tribromostyrene).

18. The flame retardant blend of claim 1 wherein the flame retarding modifier is a combination of a brominated polystyrene and an acrylic rubber composite interpolymer.

19. The flame retardant blend of claim 18 wherein the brominated polystyrene is selected from the group consisting of poly(dibromostyrene), poly(tribromostyrene) and mixtures thereof and the acrylic rubber composite interpolymer comprises from about 25 to 95 percent by weight of a first elastomeric phase polymerized from about 75 to 99.8 percent by weight of $C_1$ to $C_6$ acrylate, 0.1 to 5 percent by weight of a cross-linking monomer and about 0.1 to 5 percent by weight of a graft-linking monomer and about 75 to about 5 percent by weight of a second rigid thermoplastic phase.

20. The flame retardant blend of claim 19 wherein the brominated polystyrene is poly(tribromostyrene).

21. The flame retardant blend of claim 19 wherein the acrylic rubber composite interpolymer comprises an elastomer phase polymerized from n-butylacrylate, cross-linking monomer and graft linking monomer and the second rigid thermoplastic phase is derived from methyl methacrylate or polymethylmethacrylate.

* * * * *